(12) United States Patent
Fujii (10) Patent No.: US 7,925,933 B2
(45) Date of Patent: Apr. 12, 2011

(54) MULTIFUNCTIONAL TERMINAL DEVICE

(75) Inventor: Takanori Fujii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 604 days.

(21) Appl. No.: 11/889,256

(22) Filed: Aug. 10, 2007

(65) Prior Publication Data

US 2008/0059836 A1   Mar. 6, 2008

(30) Foreign Application Priority Data

Sep. 4, 2006   (JP) .................................. 2006-238720

(51) Int. Cl.
*G01F 11/00* (2006.01)

(52) U.S. Cl. ........................................... 714/48; 714/26

(58) Field of Classification Search ...................... 714/48
See application file for complete search history.

(56) References Cited

U.S. PATENT DOCUMENTS

| | | | | |
|---|---|---|---|---|
| 5,129,080 A * | 7/1992 | Smith | | 714/4 |
| 6,012,148 A * | 1/2000 | Laberge et al. | | 714/2 |
| 6,886,115 B2 * | 4/2005 | Kondoh et al. | | 714/52 |
| 7,536,595 B1 * | 5/2009 | Hiltunen et al. | | 714/26 |
| 2005/0021721 A1 * | 1/2005 | Takahashi et al. | | 709/223 |
| 2006/0259815 A1 * | 11/2006 | Graham et al. | | 714/11 |
| 2007/0038899 A1 * | 2/2007 | O'Brien et al. | | 714/47 |
| 2007/0174653 A1 * | 7/2007 | Berman et al. | | 714/2 |

FOREIGN PATENT DOCUMENTS

| | | |
|---|---|---|
| CN | 1574768 | 2/2005 |
| CN | 1758239 | 4/2006 |
| JP | 09-107408 | 4/1997 |
| JP | 09-211912 | 8/1997 |
| JP | 2004-187008 | 7/2004 |
| JP | 2004-265388 | 9/2004 |
| JP | 2004-530975 | 10/2004 |
| JP | 2005-267002 | 9/2005 |

OTHER PUBLICATIONS

Office Action for Chinese patent application No. 2007101491104 dated Jan. 8, 2010 (with English translation).

* cited by examiner

*Primary Examiner* — Scott T Baderman
*Assistant Examiner* — Kamini Patel
(74) *Attorney, Agent, or Firm* — Harness, Dickey & Pierce, P.L.C.

(57) ABSTRACT

A multifunctional terminal device includes a sensing unit that senses a malfunction, and a determining unit that determines a type of the malfunction when a malfunction has occurred. A selecting unit selects according to the type of the malfunction a recovery operation and a notification operation. A recovering unit performs the recovery operation, and a notifying unit performs the notification operation to notify occurrence of the malfunction.

10 Claims, 6 Drawing Sheets

SC-RECOVERY-NOTIFICATION
MANAGEMENT INFORMATION

FIG. 4B

RECOVERY-LOG DATA
TABLE

FIG. 4C

RECOVERY-LOG DATA

MULTIFUNCTIONAL TERMINAL DEVICE

CROSS-REFERENCE TO RELATED APPLICATIONS

The present application claims priority to and incorporates by reference the entire contents of Japanese priority document, 2006-238720 filed in Japan on Sep. 4, 2006.

BACKGROUND OF THE INVENTION

1. Field of the Invention

The present invention relates to a multifunctional terminal device and a method in response to a malfunction that has occurred therein.

2. Description of the Related Art

A conventional multifunctional terminal device provides a plurality of device functions including an image processing function. If a malfunction occurs in the terminal device and the malfunction requiring a certain manual operation for recovery, this terminal device recognizes that a service call (or serviceman call: SC) has occurred (or is required) and displays a warning for this so as to prompt the user to have urgent maintenance done, as disclosed in Japanese Patent Application Laid-Open No. 2004-530975.

The conventional terminal device, however, displays only "service call" without any explanation about this, and thus, the user has sometimes no idea about what to cope with this message. And the terminal device is thereby stopped for a quite long time, which may cause reduction of the period during which the user can make effective use of the terminal device.

SUMMARY OF THE INVENTION

It is an object of the present invention to at least partially solve the problems in the conventional technology.

According to an aspect of the present invention, there is provided a multifunctional terminal device that includes a sensing unit that senses a malfunction; a determining unit that determines a type of the malfunction when a malfunction has occurred; a selecting unit that selects according to the type of the malfunction a first recovery operation out of a plurality of recovery operations and a first notification operation out of a plurality of notification operations; a recovering unit that performs the first recovery operation; and a notifying unit that performs the first notification operation to notify occurrence of the malfunction.

According to another aspect of the present invention, there is provided a method in response to a malfunction that has occurred in a multifunctional terminal device. The method includes sensing a malfunction; determining a type of the malfunction when a malfunction has occurred; select according to the type of the malfunction a first recovery operation out of a plurality of recovery operations and a first notification operation out of a plurality of notification operations; recovering that includes performing the first recovery operation; and notifying that includes performing the first notification operation to notify occurrence of the malfunction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
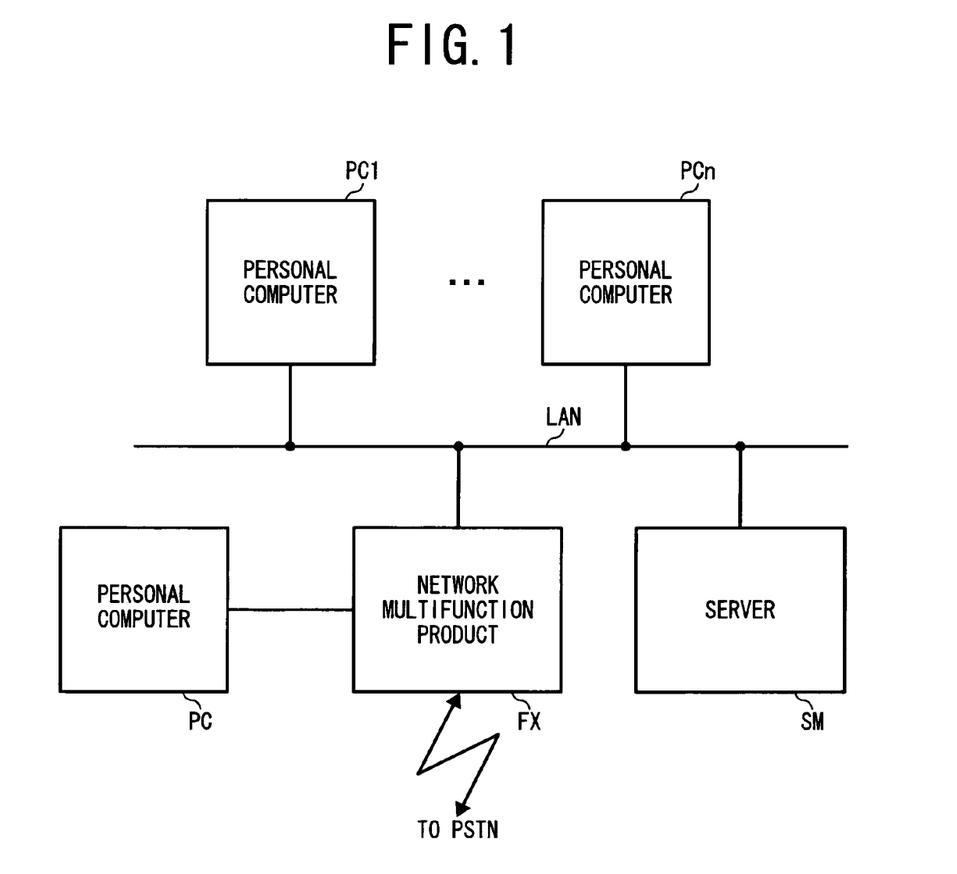
FIG. 1 is a block diagram of a network system according to an embodiment of the present invention.

FIG. 1 is a block diagram of a network system according to an embodiment of the present invention.

Connected to a local area network (LAN) are a plurality of personal computers PC1 to PCn, a server SM, and a network multifunction product FX. The personal computers are locally connected to the network multifunction product FX.

The server SM implements various server functions such as a mail server function of providing known services, such as collection and distribution of electronic mails (e-mails), to users who use the personal computers PC1 to PCn connected to the LAN, and to the network multifunction product FX.

Various programs such as facsimile application software and various types of software are introduced into each of the personal computers PC1 to PCn so as to be used by a specific user. More specifically, the facsimile application software is used to create, display, and output facsimile image information, and the various types of software are used to exchange various data through the LAN. It is noted that the specific user may be one or more users. For example, each of the personal computers PC1 to PCn includes an e-mail function of exchanging e-mails, and a network-print host device function of instructing the network multifunction product FX to perform printing through the LAN.

The network multifunction product FX includes a copier function, a printer function, a network printer function, an e-mail processing function, and a transmission function. More specifically, the copier function forms a copy of a scanned document through a local operation, the printer function accepts a print request from the locally connected the personal computers and outputs a printed matter, and the network printer function accepts a network print request from any one of the personal computers PC1 to PCn through the LAN and outputs a printed matter. The e-mail processing function exchanges image formation and various reports as an e-mail, and the transmission function is connected to a public switched telephone network (PSTN) to transmit image information by a Group 3 (G3) facsimile transmission procedure using the PSTN as a transmission path.

Figure 2:
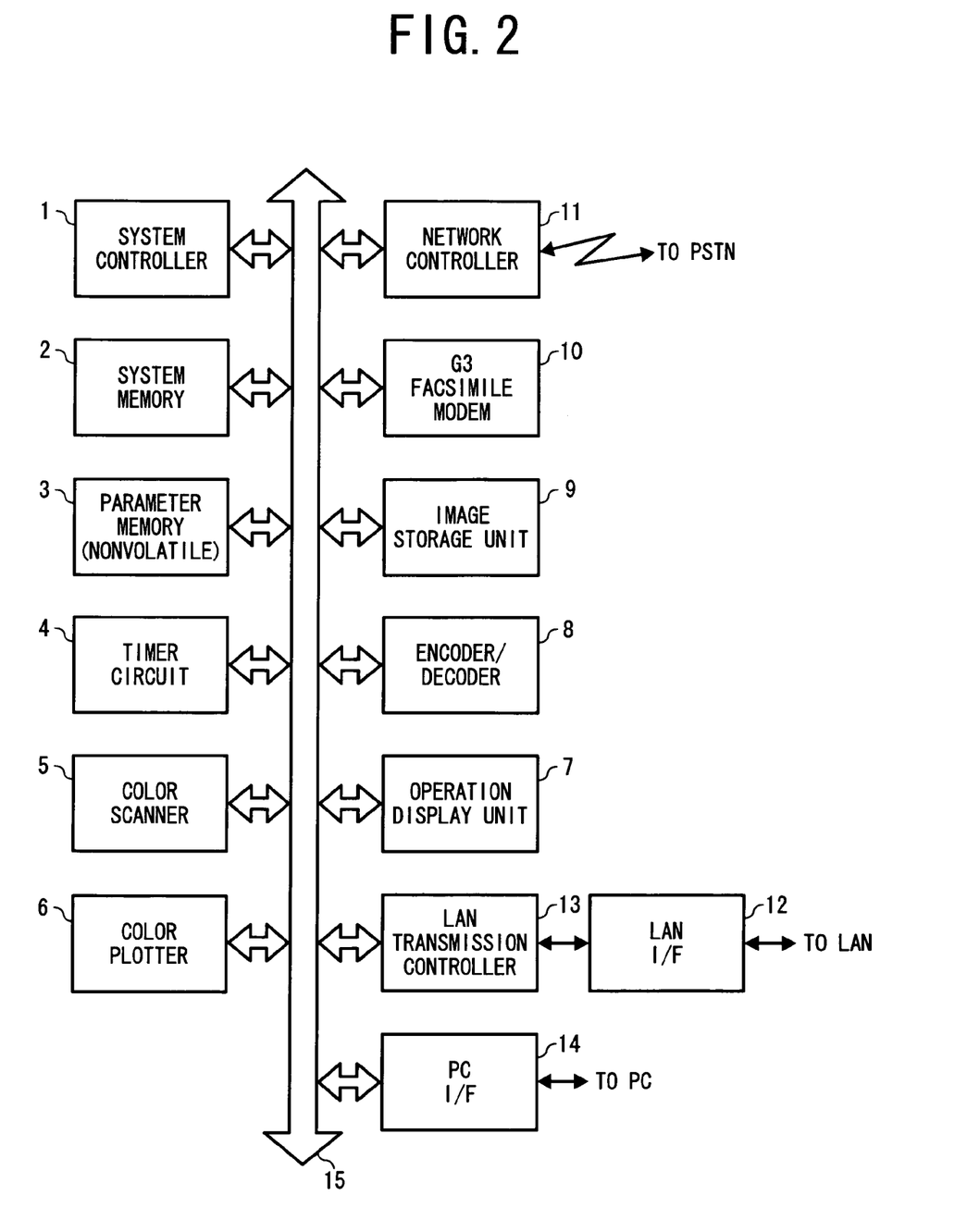
FIG. 2 is an exemplary functional block diagram of a network multifunction product shown in FIG. 1.

FIG. 2 is an exemplary functional block diagram of the network multifunction product FX.

A system controller 1 performs various control processes such as control over each component of the network multifunction product FX and a control procedure of facsimile transmission. A system memory 2 stores therein a control processing program executed by the system controller 1 and various data required for execution of the processing program, and functions as a work area for the system controller 1. A parameter memory 3 stores therein various types of information specific to the network multifunction product FX. A timer circuit 4 outputs current time information.

A color scanner 5 scans an original document in full colors at a predetermined resolution. A color plotter 6 outputs a full-color image at a predetermined resolution. An operation display unit 7 is used to operate the network multifunction product FX. The operation display unit 7 includes various operation keys and indicators.

An encoder/decoder 8 encodes and compresses an image signal, and decodes encoded and compressed image information to the original image signal. An image storage unit 9 stores therein many pieces of encoded and compressed image information.

A G3 facsimile modem 10 implements a modem function for G3 facsimile. The G3 facsimile modem 10 includes a low-speed modem function (V.21 modem) of exchanging a transmission procedure signal and a high-speed modem function (V.17 modem, V.34 modem, V.29 modem, V.27 ter modem, etc.) of exchanging mainly image information.

A network controller 11 connects the network multifunction product FX to the PSTN. The network controller 11 includes an automatic transmission/reception function.

A LAN interface (I/F) 12 connects the network multifunction product FX to the LAN. A LAN transmission controller 13 performs a communication control process for predetermined protocol suites to exchange various data with another terminal device via the LAN.

A PC interface (I/F) 14 is connected with the personal computers, and exchanges various types of information with the personal computers.

These components such as the system controller 1, the system memory 2, the parameter memory 3, the timer circuit 4, the color scanner 5, the color plotter 6, the operation display unit 7, the encoder/decoder 8, the image storage unit 9, the G3 facsimile modem 10, the network controller 11, the LAN transmission controller 13, and the PC I/F 14 are connected to an internal bus 15. Data is exchanged among these components mainly via the internal bus 15.

The network controller 11 and the G3 facsimile modem 10 directly exchange data with each other.

Figure 3:
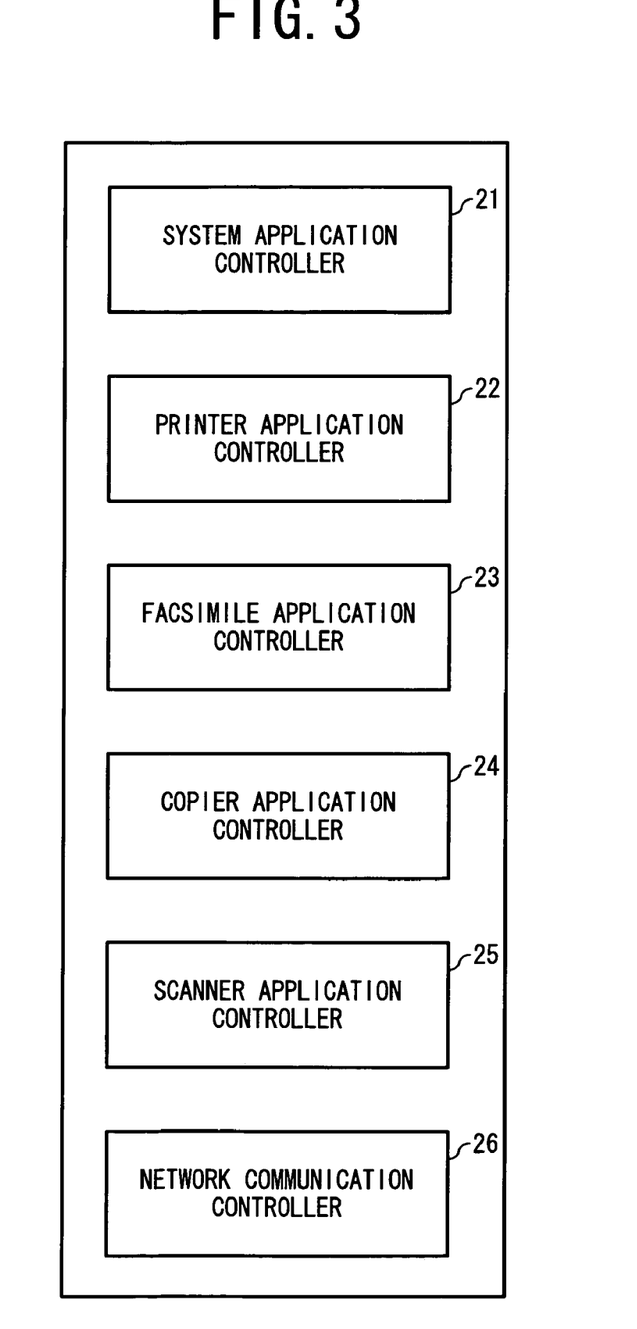
FIG. 3 is a block diagram of an exemplary list of software functions performed by a system controller shown in FIG. 2.

FIG. 3 is a block diagram of an exemplary list of software functions performed by the system controller 1.

A system application controller 21 implements basic functions for control processes such as an operating system performed by the system controller 1. A printer application controller 22 implements an operation of a local printer function or of a network printer function. More specifically, the local printer function is performed between the printer application controller 22 and the personal computers connected thereto via the PC I/F 14, and the network printer function is performed between the printer application controller 22 and each of the personal computers PC1 to PCn connected thereto via the LAN.

A facsimile application controller 23 implements a G3 facsimile communication function. A copier application controller 24 implements a copying function using the color scanner 5 and the color plotter 6. A scanner application controller 25 implements a scan-to-email function and a document box function. More specifically, the scan-to-email function is used to transmit image data scanned by the color scanner 5 using an e-mail, and the document box function is used to locally store therein documents. A network communication controller 26 implements a communication function of communicating data with other terminal devices using the LAN.

In the present embodiment, data exchange between terminals that are connected to the LAN is performed basically by using a combination (protocol suits) of a transmission protocol called "transmission control protocol/internet protocol (TCP/IP)" for up to a transport layer with another communication protocol for a layer higher than the transport layer. For example, a communication protocol called "simple mail transfer protocol (SMTP)" is used as the communication protocol for the higher layer for exchange of data by the e-mail. Further, a line printer daemon protocol (LPR) is used for exchange of data related to the network printer function.

The communication protocols such as TCP/IP, SMTP, and LPR, and data formats and data structures of e-mails are defined by request for comments (RFC) documents issued by Internet Engineering Task Force (IETF). For example, TCP is defined by RFC 793, IP by RFC 793, SMTP by RFC 821, and formats of the e-mail are defined by RFC 822, RFC 1521, and RFC 1522 (MIME (multi purpose mail extensions format). LPR is defined by RFC 1179 or the like.

There may be a case where any malfunction occurs in the network multifunction product FX for some reason and it will be impossible to recover from the malfunction without a manual operation. The network multifunction product FX recognizes this case as occurrence of a service call (serviceman call: SC).

Figure 4A:
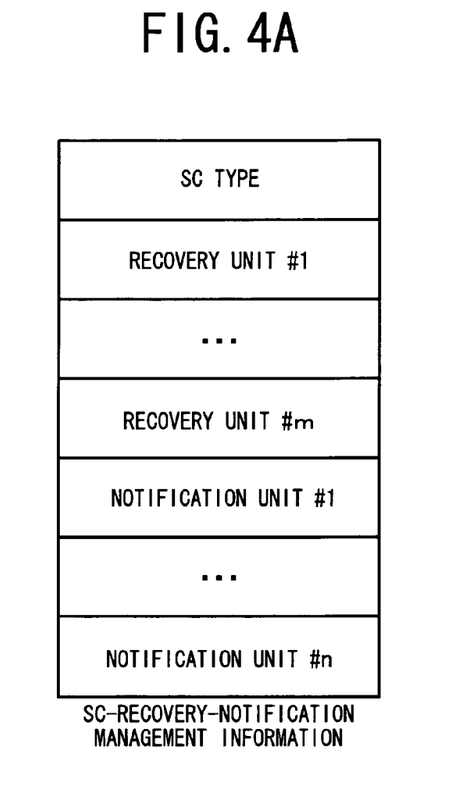
FIG. 4A is a schematic diagram for explaining contents of SC-recovery-notification management information.

In the present embodiment, how to handle each sensed SC based on its type is registered in SC-recovery-notification management information as shown in FIG. 4A. The SC-recovery-notification management information registers therein at least one recovery unit and notification unit corresponding to each SC type.

The recovery unit includes a system recovery unit that reboots the entire system, and an application recovery unit that initializes and restarts each one of the printer application controller 22, the facsimile application controller 23, the copier application controller 24, the scanner application controller 25, and the network communication controller 26.

The notification unit includes an SC indicator (not shown) that is provided in the operation display unit 7 for notifying occurrence of SC by lighting; various display units such as a display unit that displays a specific warning and warning symbol on its liquid crystal display; and an SC-occurrence-mail transmission unit that sends an e-mail to a predetermined person who is in charge of maintenance (hereinafter, "maintenance person").

Figure 4B:
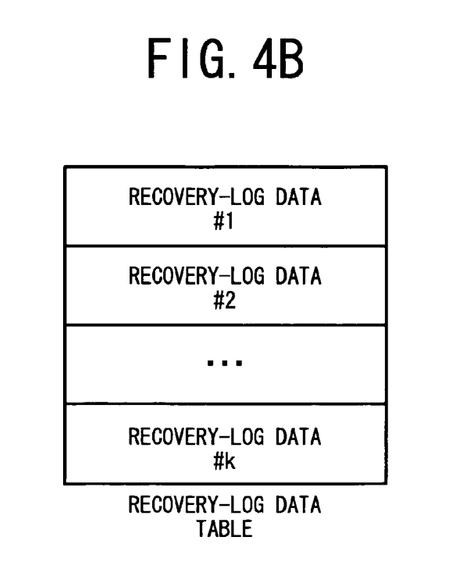
FIG. 4B is a schematic diagram for explaining contents a recovery-log data table.
Figure 4C:
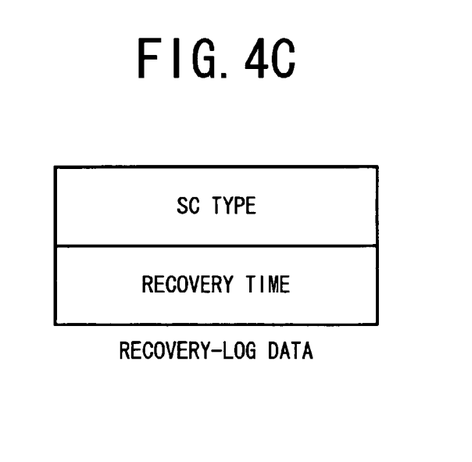
FIG. 4C is a schematic diagram for explaining contents of recovery-log data.

When an SC is sensed, the recovery-log data is created and stored in the recovery-log data table, before some recovery operations are performed. One example of the recovery-log data table is shown in FIG. 4B, and one example of the recovery-log data is shown in FIG. 4C. In FIG. 4C, the recovery-log data has an SC type and a recovery time indicating when the recovery operation is performed.

Figure 5:
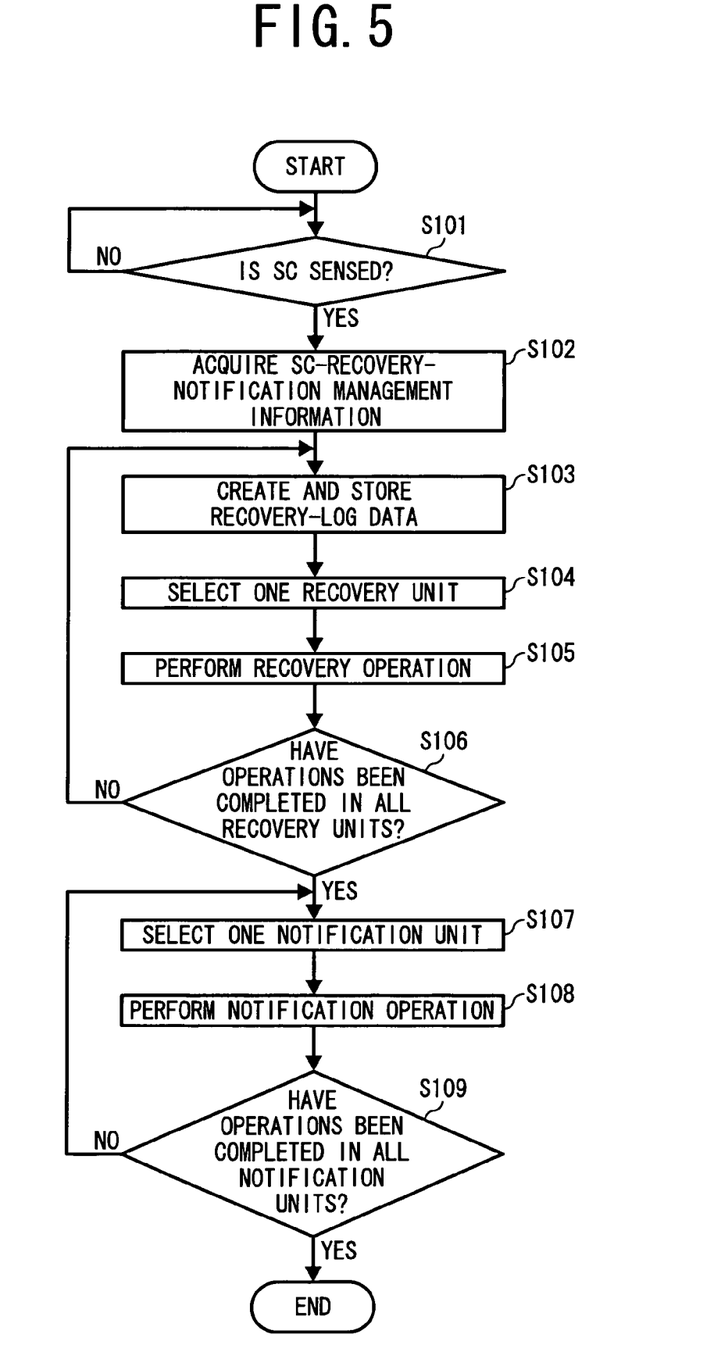
FIGS. 5 to 7 are flowcharts of exemplary processes that are performed when an SC is sensed.

FIG. 5 is a flowchart of a process that is performed when an SC is sensed.

When an SC is sensed (Yes at step S101), SC-recovery-notification management information corresponding to the SC is acquired (step S102), and recovery-log data is created and stored (step S103).

Next, one recovery unit is selected from the acquired SC-recovery-notification management information (step S104), and the recovery operation for the selected recovery unit is performed (step S105). It is checked whether the operations have been completed in all the recovery units (step S106). When all of the operations is not performed (No at step S106), the process control returns to step S104 to perform a not-performed recovery operation.

When all of the operations is performed (Yes at step S106), one notification unit is selected from the acquired SC-recovery-notification management information (step S107), and the notification operation for the selected notification unit is performed (step S108). It is checked whether the operations have been completed in all the notification units (step S109). When all of the operations is not performed (No at step S109), the process control returns to step S107 to perform a not-performed notification operations.

When all of the operations is performed (Yes at step S109), the process control goes to end.

In the above example, both of the recovery unit and the notification operation are performed corresponding to a sensed SC. Therefore, the occurrence of the SC can be appropriately notified to the user, and the automatic operation in response to the SC can also be performed. This helps to minimize stop time of the network multifunction product.

Accordingly, when a sensed malfunction is one that will be recovered only by an automatic operation, the network multifunction product performs self-reboot, while when a sensed malfunction is one that require a manual operation, then the network multifunction product sends a notification to the user. This enhances usability of the network multifunction product.

It is possible to define a plurality of operations in response to a malfunction, order of the operations to be performed, and conditions under which the operations is performed. With such settings, it is possible to more reliably notify the user of the malfunction, for example, displaying a warning on the operation screen and sending an e-mail for notifying the user of occurrence of the malfunction a predetermined time after the malfunction is sensed if the user does not check the warning on the screen.

When an operation is selected in response to occurrence of malfunction, by allowing for a prohibited combination, it is possible to prevent behaviors which are no use and also cause the user to get confused. More specifically, the behaviors are such that even if the display for the occurrence of malfunction on the operation display unit to notify the user of this matter and the self-reboot for automatic recovery are simultaneously or continuously executed, the device is self-rebooted after it is displayed and the display disappears (momentarily displayed), or the display for warning the user of malfunction is made after the malfunction is recovered by the self-reboot.

Figure 6:
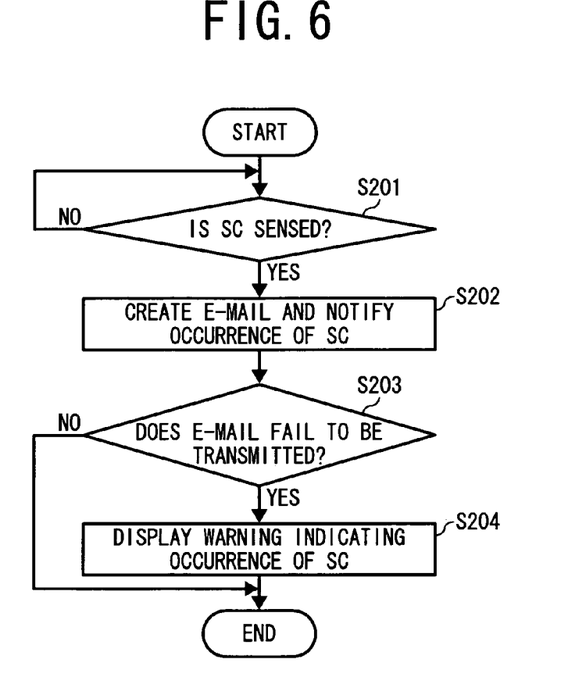

FIG. 6 is a flowchart of another process that is performed when an SC is sensed.

When an SC is sensed (Yes at step S201), an operation corresponding to the SC is performed, and an e-mail for notifying occurrence of the SC is created and transmitted to a maintenance person (step S202).

Next, it is checked whether the e-mail fails to be transmitted (step S203). To determine whether the e-mail fails to be transmitted, formats for delivery confirmation such as delivery status notifications (DSN) and message disposition notifications (MDN) can be used.

When it is determined that the e-mail fails to be transmitted (Yes at step S203), warning indicative of occurrence of the SC is displayed (step S204). When it is determined that the e-mail succeeds to be transmitted (No at step S203), then the process control skips step S204 and goes to end.

If the e-mail for notification of occurrence of the SC is successfully transmitted to the maintenance person, the warning indicative of occurrence of the SC is not displayed.

While when the transmission of the e-mail is not successful, the warning is displayed.

By displaying in the above manner, even if some confusion may occur in the following case, the confusion can be eliminated. Namely, there is the case where a first notification unit is set to notify the user of occurrence of a malfunction by an e-mail and a second notification unit is set to display the malfunction on an operation panel. In this case, if a warning indicative occurrence of malfunction is displayed on the operation panel despite successful transmission of the e-mail and if a first user views the warning and a second user reads the e-mail, a situation as follows may occur. That is, after the first user has recovered the network multifunction product from the malfunction, the second user immediately comes up to recover the network multifunction product. This situation may cause the users to get confused because the order of checking the warning and the e-mail is not defined.

In this case, a first operation is for notifying occurrence of a malfunction by e-mail, and a second operation is for displaying a warning indicative of occurrence of the malfunction. If the second operation is performed only when the e-mail fails to be transmitted, the users will not being easily confused, and such reliable notification configuration improves usability of the network multifunction product.

Figure 7:
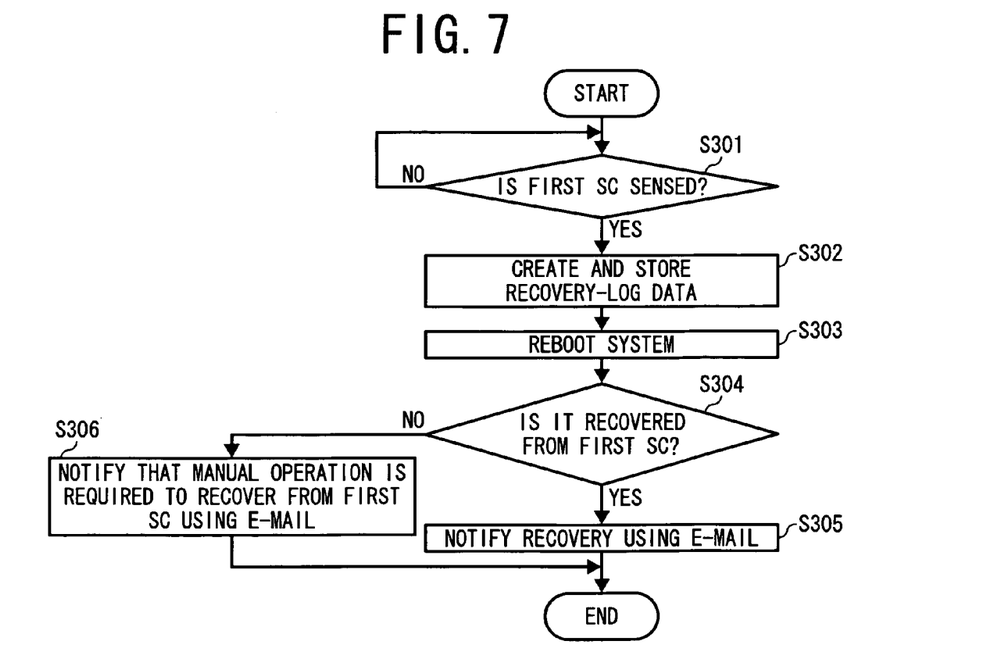

FIG. 7 is a flowchart of still another process that is performed when an SC is sensed.

When a first SC is sensed (Yes at step S301), recovery-log data is created and stored (step S302), and the system is rebooted (step S303). If a second SC is sensed after the system is rebooted, and the second SC has a type identical to that of the latest SC (i.e., the first SC) registered as the recovery-log data, it is determined that it has not been recovered from the first SC (No at step S304).

When it is determined that it has not been recovered from the first SC (No at step S304), a first e-mail is created and transmitted so as to notify the maintenance person that a manual operation is required to recover from the first SC (step S306). When it is determined that it has been recovered from the first SC (Yes at step S304), a second e-mail is created and transmitted so as to notify the maintenance person that it has been recovered from the first SC (step S305).

If a malfunction is sensed and it is determined that automatic recovery from the malfunction is possible, then the recovery is attempted by self-reboot. In the conventional network multifunction product, if the malfunction is still remained after the self-reboot and the same malfunction is sensed, the self-reboot is repeated. The network multifunction product is out of operation during this trouble, and the abnormal status is not notified to the user. In the present embodiment, such a situation can be avoided, thus enhancing the usability of the network multifunction product.

Moreover, if it is successfully recovered from the malfunction as a result of the operation performed by the recovery unit, an appropriate notification of recovery from the malfunction is transmitted to the maintenance person. This enhances maintenance of the network multifunction product.

It is noted that an embodiment is also applicable to any other multifunctional terminal devices having a different configuration from the network multifunction product according to the embodiment.

According to an embodiment of the present invention, upon sensing a malfunction that has occurred therein, the multifunctional terminal device performs an appropriate operation depending on the sensed malfunction. This makes it possible to greatly reduce time that the user has to take to recover the multifunctional terminal device from the malfunction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multifunctional terminal device comprising:
a sensing unit that senses a malfunction;
a determining unit that determines a type of the malfunction when a malfunction has occurred;
a selecting unit that selects according to the type of the malfunction a recovery operation out of a plurality of recovery operations and a notification operation out of a plurality of notification operations;
a recovering unit that performs the recovery operation;
a storing unit that stores recovery management information representative of a recovery operation to be performed for the sensed malfunction and stores recovery-log data representative of a history of recovery operations performed based on the recovery management information; and
a notifying unit that performs the notification operation to notify occurrence of the malfunction,
wherein when, after the sensing unit senses a first malfunction and the recovering unit performs the recovery operation corresponding to the first malfunction, the sensing unit senses a same malfunction that is identical to the type of the first malfunction stored as the recovery-log data, the recovering unit does not perform the recovery operation and the notifying unit performs the notification operation corresponding to the same malfunction.

2. The multifunctional terminal device according to claim 1, wherein
the first recovery operation and the first notification operation include a plurality of operations, and
the recovering unit performs the operations of the first recovery operation in a predetermined order, and
the notifying unit performs the operations of the first notification operation in a predetermined order.

3. The multifunctional terminal device according to claim 1, wherein when the multifunctional terminal device recovers from the malfunction, the notifying unit notifies recovery of the multifunctional terminal device.

4. The multifunctional terminal device according to claim 1, wherein the storage unit stores therein log data of the first operation to be performed by the recovering unit.

5. A method in response to a malfunction that has occurred in a multifunctional terminal device, the method comprising:
sensing a malfunction;
determining a type of the malfunction when a malfunction has occurred;
storing in a storage unit recovery management information representative of a recovery operation to be performed for the sensed malfunction and storing recovery-log data representative of a history of recovery operations performed based on the recovery management information:
selecting according to the type of the malfunction a recovery operation out of a plurality of recovery operations and a notification operation out of a plurality of notification operations;
recovering that includes performing the recovery operation; and
notifying that includes performing the notification operation to notify occurrence of the malfunction, wherein
when, after a first malfunction is sensed at the sensing and the recovery operation corresponding to the first malfunction is performed at the recovering, a same malfunction that is identical to the type of the first malfunction is sensed at the sensing and stored as the recovery-log data, the recovering includes not performing the recovery operation and the notifying unit includes performing a notification operation corresponding to the same malfunction.

6. The method according to claim 5, wherein
the first recovery operation and the first notification operation include a plurality of operations, and
the recovering includes performing the operations of the first recovery operation in a predetermined order, and
the notifying includes performing the operations of the first notification operation in a predetermined order.

7. The method according to claim 5, wherein when the multifunctional terminal device recovers from the malfunction, the notifying includes notifying recovery of the multifunctional terminal device.

8. The method according to claim 5, wherein the storing includes storing log data of the first operation to be performed at the recovering.

9. The multifunctional terminal device according to claim 1, wherein the multifunction terminal device is a multifunction printer.

10. The multifunctional terminal device according to claim 1, further comprising a memory having a printer application, a facsimile application, a copier application and a scanner application, stored thereon.

* * * * *